US012658972B2

(12) United States Patent
Antolinos

(10) Patent No.: US 12,658,972 B2
(45) Date of Patent: Jun. 16, 2026

(54) UWB RADIO TRANSMITTER DEVICE COMPRISING A SENSOR FOR SENSING A STATE OF A PHYSICAL PROPERTY FOR THE TRANSMISSION THEREOF

(71) Applicant: APITRAK SAS, Meylan (FR)

(72) Inventor: Luc Antolinos, Toulouse (FR)

(73) Assignee: APITRAK SAS, Meylan (FR)

( * ) Notice: Subject to any disclaimer, the term of this patent is extended or adjusted under 35 U.S.C. 154(b) by 410 days.

(21) Appl. No.: 18/245,110

(22) PCT Filed: Sep. 17, 2021

(86) PCT No.: PCT/EP2021/075713
§ 371 (c)(1),
(2) Date: Mar. 13, 2023

(87) PCT Pub. No.: WO2022/058558
PCT Pub. Date: Mar. 24, 2022

(65) Prior Publication Data
US 2023/0370113 A1 Nov. 16, 2023

(30) Foreign Application Priority Data

| | | | |
|---|---|---|---|
| Sep. 18, 2020 | (FR) | ...................................... | 2009474 |
| Sep. 18, 2020 | (FR) | ...................................... | 2009475 |
| Sep. 18, 2020 | (FR) | ...................................... | 2009480 |

(51) Int. Cl.

| | |
|---|---|
| *H04B 1/04* | (2006.01) |
| *H02J 3/14* | (2026.01) |
| *H04B 1/02* | (2006.01) |
| *H04B 1/71* | (2011.01) |
| *H04B 1/7163* | (2011.01) |
| *H05B 37/02* | (2006.01) |

(52) U.S. Cl.
CPC ........... *H04B 1/71635* (2013.01); *H04B 1/04* (2013.01)

(58) Field of Classification Search
None
See application file for complete search history.

(56) References Cited

U.S. PATENT DOCUMENTS

| | | | |
|---|---|---|---|
| 10,573,093 B2 * | 2/2020 | Breed .................... | G07C 5/008 |
| 10,695,167 B2 * | 6/2020 | Van Heugten ........ | A61F 2/1624 |

(Continued)

OTHER PUBLICATIONS

International Search Report as issued in International Patent Application No. PCT/EP2021/075713, dated Dec. 21, 2021.

(Continued)

*Primary Examiner* — Pablo N Tran
(74) *Attorney, Agent, or Firm* — CUSHMAN PARTNERS LLC

(57) ABSTRACT

A UWB radio transmitter device including a UWB radio transmission module and a UHF radio reception module for collecting signals for electrically supplying the UWB transmission module, wherein the UWB radio transmitter device includes a state sensor of a physical property of an element of the sensor, a change in state of the physical property of the element resulting in a modification of an electrical state of an electrical interface of the sensor, the transmission of a UWB signal including the transmission of data corresponding to the electrical state of the electrical interface.

16 Claims, 2 Drawing Sheets

(56) References Cited

U.S. PATENT DOCUMENTS

Figure 1:
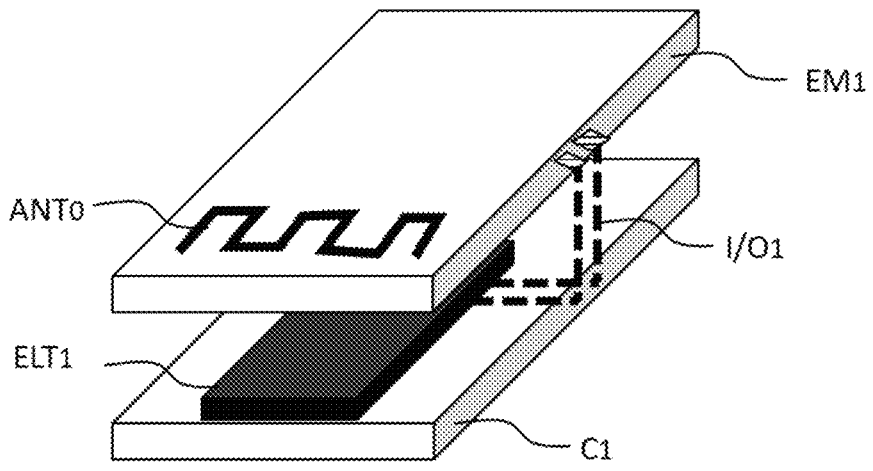

| | | | |
|---|---|---|---|
| 12,098,020 B2 * | 9/2024 | West | E05C 7/02 |
| 2017/0086281 A1 * | 3/2017 | Avrahamy | H05B 39/086 |

OTHER PUBLICATIONS

Tamburini, C., et al., "A CMOS RF-Powered Tag with Sensing and Localization Capabilities," 2018 IEEE 23rd International Workshop on Computer Aided Modeling and Design of Communication Links and Networks (CAMAD), Sep. 2018, XP033433677, pp. 1-5.

Zheng, L., et al., "Design and Implementation of a Fully Reconfigurable Chipless RFID Tag Using Inkjet Printing Technology," Circuits and Systems, 2008. ISCAS 2008, IEEE International Symposium On, IEEE, May 2008, XP031392275, pp. 1524-1527.

Lee, K. K., et al., "A Wireless-Powered IR-UWB Transmitter for Long-Range. Passive RFID Tags in 90-nm CMOS," IEEE Transactions on Circuits and Systems II: Express Briefs, vol. 61, No. 11, Nov. 2014, XP011563639, pp. 870-874.

* cited by examiner

UWB RADIO TRANSMITTER DEVICE COMPRISING A SENSOR FOR SENSING A STATE OF A PHYSICAL PROPERTY FOR THE TRANSMISSION THEREOF

CROSS-REFERENCE TO RELATED APPLICATIONS

This application is the U.S. National Stage of PCT/EP2021/075713, filed Sep. 17, 2021, which in turn claims priority to French patent application number 2009475 filed Sep. 18, 2020, French patent application number 2009480 filed Sep. 18, 2020 and French patent application number 2009474 filed Sep. 18, 2020. The content of these applications are incorporated herein by reference in their entireties.

FIELD OF THE INVENTION

The field of the invention relates to the field of UWB radio transmitter devices, of the radio tag type, comprising a module for receiving UHF radio energy to supply the electronic components of said transmitter device. The field of the invention relates to transmitter devices associated with physical sensors.

Prior Art

There are radio-tag type transmitting devices collecting radio energy to supply the electronic components of said tag. However, existing solutions do not make it possible to transmit a state variable other than data saved in a memory of the tag due to insufficient energy.

There is a need to define a transmitter device which returns a physical variable of a sensor when the latter is not powered or does not have enough energy to transmit such a variable.

SUMMARY OF THE INVENTION

According to one aspect, the invention relates to a UWB radio transmitter device comprising a UWB radio transmission module and a UHF radio reception module for collecting signals for electrically supplying the UWB transmitter module, characterized in that said UWB tag comprises a sensor for sensing a state of a physical property of an element of said sensor, a change in state of said physical property of the element resulting in a change in an electrical state of an electrical interface of said sensor, the transmission of a UWB signal comprising the transmission of a data corresponding to the electrical state of the electrical interface.

One advantage is to make it possible to physically store a state of the sensor that will be transferred when the tag has enough energy. According to one embodiment, the state of the physical property is sent regularly at each transmission of a UWB message.

According to one embodiment, changing the state of the physical property passively affects the electrical conductivity of a physical region of the sensor. This region preferably forms an electrical interface of said transmitter device. It is connected to the reading inputs of a transmitter device electronic chip, the transmission of a UWB signal comprising the reading of the electrical state of said electrical interfaces and the transmission of a data corresponding to said electrical state.

According to one embodiment, the transmission is performed from the energy collected by the UHF radio reception module.

According to one embodiment, the transmitted data further comprises an identifier stored in a memory of the transmitter device and a data characterizing the type of sensor.

According to one embodiment, the change in state of the physical property relates to a change in a chemical property of a material, a change in conductivity of a zone of said sensor, a change in the mechanical state of a zone of said sensor.

According to one embodiment, the change in conductivity of a zone of said sensor corresponds to a change in the voltage, impedance of said zone.

According to one embodiment, the sensor is made removable from the transmitter device.

According to one embodiment, when sufficient energy is collected by the UHF radio wave reception module, the UWB transmission module automatically reads the value of the physical state of the sensor and automatically transmits a UWB message comprising said data.

When it wakes up, the transmitter device reads at least two inputs from an electronic chip. At least one piece of the data can be data saved in memory.

The UHF radio wave reception module generates energy within an electrical energy storage capacitor. For example, electrical energy is obtained from a rectifier to transform the analog signal into an electrical signal.

According to one embodiment, the sensor is a sensor among all the following sensors:

- an impact sensor comprising an accelerometer;
- a tread;
- a mechanical indicator of a seal;
- a container of a chemical reagent;
- a sensor comprising a hot melt material;
- a pressure sensor;
- a humidity sensor comprising a pellet the conductivity of which is modified when the humidity of said pellet exceeds a threshold;
- a usage counter;
- a pull-off detector.

Figure 2:
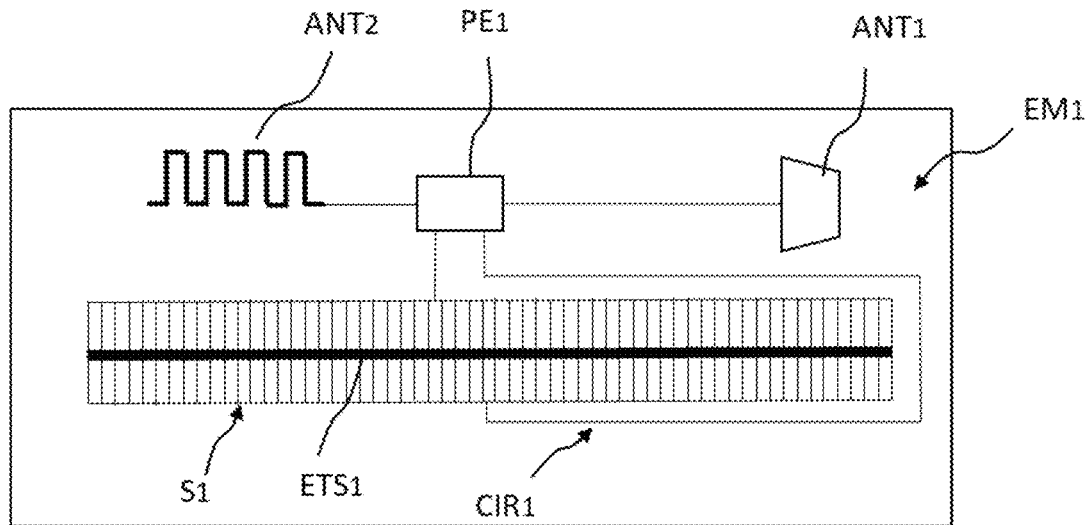
Figure 3:
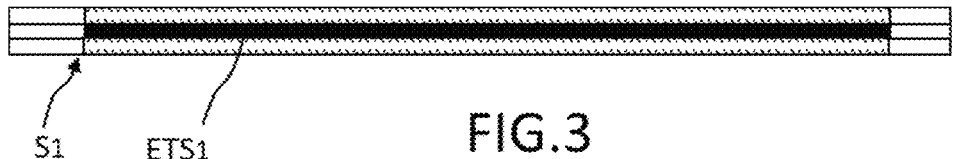
Figure 4:
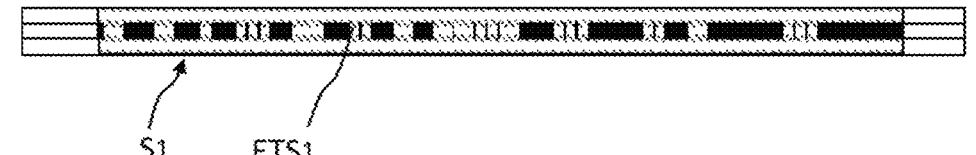
Figure 5:
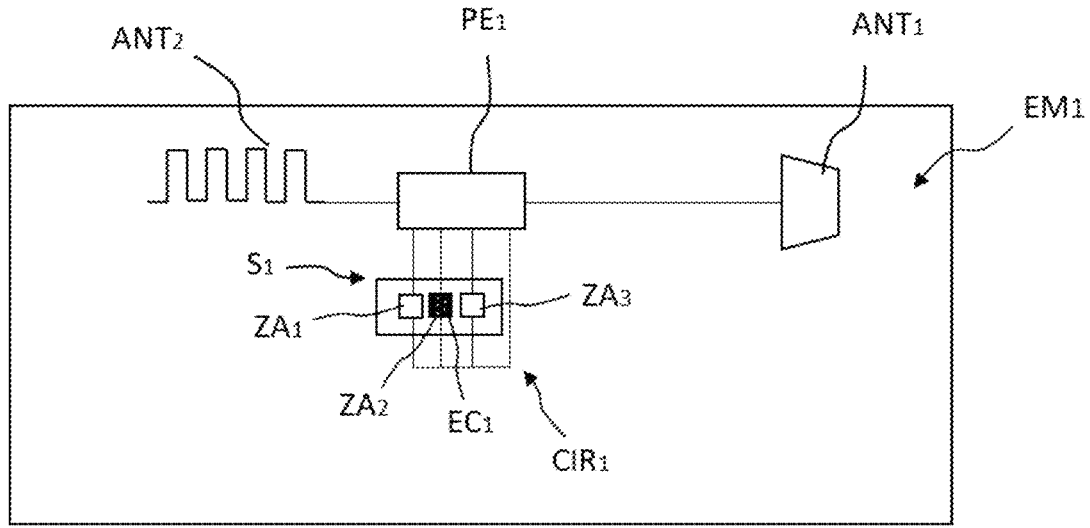
Figure 6:
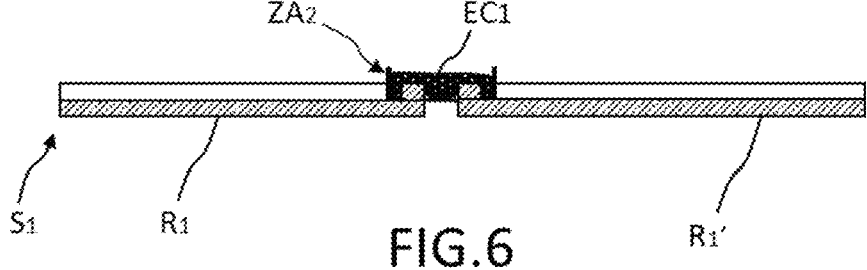

Other characteristics and advantages of the invention will become clearer on reading the following detailed description, with reference to the appended figure, that illustrates:

[FIG. 1]: an example embodiment of the invention comprising a transmitter device associated with a sensor of a physical state;

[FIG. 2]: a front view of a first example of a transmitter device of the invention comprising a heat-sensitive support not yet thermally printed;

[FIG. 3]: a side view of a second example of a transmitter device of the invention comprising a heat-sensitive support not yet thermally printed;

[FIG. 4]: a side view of the second example of the transmitter device of the invention comprising a heat-sensitive support that has been printed;

[FIG. 5]: a front view of a first example of a transmitter device of the invention comprising three zones to receive a quantity of conductive ink,

[FIG. 6]: a side view of a second example of a transmitter device of the invention comprising a support comprising a zone to receive a quantity of conductive ink.

The notation "UWB" refers to the "Ultra Wide Band" frequency band. The notation "UHF" refers to the "Ultra High Frequency" band.

FIG. 1 shows an embodiment of a transmitter device $EM_1$ associated with a sensor $C_1$. According to one embodiment, the transmitter device $EM_1$ comprises the sensor. According to another embodiment, the transmitter device $EM_1$ may be associated with a removable sensor $C_1$. These two parts $EM_1$ and $C_1$ can be part of the same object, or able to be clipped together. When the two parts {transmitter device; sensor} can be clipped together, the object may consist of a radio wafer attached to a base support of the sensor.

The transmitter device $EM_1$ comprises an antenna $ANT_0$ making it possible to receive radio signals to supply the components of the transmitter device $EM_1$ and more particularly a UWB radio transmission module transmitting signals in the UWB band. The UWB antenna is not shown in FIG. 1.

The sensor $C_1$ comprises an element $ELT_1$ the physical modification of which causes a change in state of an electrical I/O interface$_1$. One interest is to allow an electronic chip (not shown) of the transmitter device to read the electrical state of the electrical interfaces in order to integrate the data read in a UWB message when the latter is transmitted.

One advantage is to save data during a long sleep time of the transmitter device and to transmit the latter when the radio transmitter wakes up when it receives sufficient radio energy.

According to one embodiment, the transmitter device $EM_1$ is a radio tag, also called TAG. It includes a transmission function in the UWB band and a reception function in the UHF band.

According to one embodiment, the sensor C1 rests on a mechanical, chemical, etc. aspect in order to persist its state and operate without electrical energy. The mechanical/chemical sensor behaves like a state switch. The state will be read by the I/O interface1 of the radio transmitter $EM_1$ part.

The UWB radio transmission module has at least one input of an I/O electrical interface to retrieve a state at the time of sending. According to another embodiment, the transmitter device $EM_1$ comprises a function making it possible to inhibit the transmission of the UWB signal or to cause a spontaneous transmission according to the mechanical, chemical or electrical state of the sensor $C_1$, for example by a switch function of the sensor $C_1$. According to another case, depending on the value of the mechanical, chemical or electrical state of the sensor $C_1$, the UHF wave reception function for energy collection may be active or inhibited.

If the electronic chip of the transmitter device $EM_1$ does not comprise a readable I/O, according to one embodiment, a switch of the sensor is implemented to stop UWB emission or to stop the collection of UHF waves for their conversion into electrical energy.

In the latter case, the non-reception of UWB signals by the beacons may mean that the switch is open. On the other hand, the transmission of UWB signals and therefore their reception by at least one beacon can mean that the switch is closed.

According to one embodiment, to avoid false positives/negatives, the transmitter device of the invention may comprise two electronic chips making it possible to read two pieces of information on the electrical I/O interfaces$_1$. The transmitter device $EM_1$ may comprise two UWB antennas to have a first permanent active antenna and a second antenna controlled by the switch of the sensor $C_1$.

According to different examples, the associated or integrated sensor in the transmitter device EM1 can be of different types.

According to a first example, it may be an impact sensor. The impact triggers a switch beyond a certain acceleration. This switch can be mechanically blocked, for example. It can be activated by breaking a flask containing conductive liquid or by a reinforced spring leaf that is triggered beyond an acceleration and remains locked in a stable final state.

According to a second example, it may be a wear sensor of a tread. In this case, the switch opens when the tread containing a wire is worn. This could be, for example, a tire out of service.

According to a third example, it may be an expiration sensor. In this case, it may be a chemical reagent flask that is activated at the time of installation of the transmitter device $EM_1$. The reagent reacts for a long time, for example by migration on a substrate. When the reagent reaches the end of its migration or reaction, it touches a conductive part or inhibits conduction and acts as a switch.

According to a fourth example, it may be a sensor detecting a break in the cold chain. A part composed of a frozen liquid spreads in case of a break in the cold chain. The flowing liquid then triggers, or inhibits, a conduction for the switch.

According to a fifth example, this may be a pressure sensor. In this case, a mechanical part engages and remains locked if a high- or low-pressure threshold is exceeded.

According to a sixth example, it may be a sensor comprising an indicator of a seal, such as an indicator of opening of a package or an object. In this case, a self-adhesive strip contains a closed track connected to the transmitter device $EM_1$. This strip is glued onto the package or an object at its opening. If the seal is cut or pulled off, the track is open and the switch is then in the open position.

According to a seventh example, it may be a humidity sensor. A pellet becomes conductive, or degrades and becomes non-conductive, in the presence of humidity beyond a threshold. It is then known whether a package or an object has been wetted or exposed to over-humidity.

According to an eighth example, it may be a usage counter. In this case, a mechanical device is actuated by a small probe/lever. Each time it can be activated, it activates a cogwheel such as that of car counters, for example old cars. When the wheel has finished counting its maximum, the switch opens or closes. The invention then makes it possible to know whether a usage cycle has been exceeded when the UWB message comprising this data is received by a reception beacon.

According to a ninth example, it may be a pull-off detection sensor. In this case, a probe triggers the opening or closing of a switch permanently if it is pulled off the support. This mode can, for example, be integrated on an extinguisher if the pin is pulled off.

According to a tenth example, a radio transmitter device $EM_1$ is integrated on a mask, for example, when it takes the form of a small wafer. When the mask has been worn sufficiently, the sensor $C_1$ triggers a change in a physical state, for example by detection of a humidity threshold. Such a mask helps to locate contaminated people or to know when the mask has expired. According to one embodiment, detecting an expired mask makes it possible to grant or deny access to a given zone.

According to one embodiment, the sensor includes a physical mechanism implementing a manual reset system to reuse the transmitter device $EM_1$ later.

According to one embodiment, when the change of state is a chemical state change, the sensor comprises a removable part representing a consumable item that can be replaced.

The transmitter device $EM_1$ can then be kept for re-association with a new consumable item.

Example Embodiment of the Invention when the Sensor is of the Electrical Conductor Type Coupled to a Heat-Sensitive Element.

According to another aspect, the invention relates to a radio transmitter device comprising a radio transmission module and a radio reception module for collecting signals for electrically supplying the transmission module, characterized in that said transmitter device comprises a support comprising electrically conductive regions and a heat-sensitive element, a thermal printing of said element modifying the electrical conductivity of a plurality of physical regions of said support, said physical regions of the support forming a set of electrical interfaces connected to the reading inputs of an electronic chip of said transmitter device, the transmission of a signal being performed successively to the reading of the electrical state of said electrical interfaces and the encoding of data corresponding to said electrical state read by the chip, said transmitted signal comprising said encoded data.

According to one example, the radio transmitter device transmits in the UWB frequency range, "Ultra Wide Band", it is therefore a UWB transmitter. According to another example, the transmitter is an RFID type transmitter. In the latter case, RFID antennas can transmit at low frequencies 125 KHz or at high frequencies 13.56 MHz for passive transmitters. RFID antennas can transmit in frequencies around 2.4 GHz for passive, active and semi-active transmitters, even in UHF frequencies around 868 MHz for certain passive and active transmitters.

According to yet another aspect, the invention relates to a UWB radio transmitter device comprising a UWB radio transmission module and a UHF radio reception module for collecting signals for electrically supplying the UWB transmission module, said UWB transmitter device comprising a support comprising electrically conductive regions and a heat-sensitive element, a thermal printing of said element modifying the electrical conductivity of a plurality of physical regions of said support, said physical regions of the support forming a set of electrical interfaces connected to the reading inputs of an electronic chip of said UWB transmitter device, the emission of a UWB signal being performed successively to the reading of the electrical state of said electrical interfaces and the encoding of data corresponding to said electrical state read by the chip, said transmitted signal comprising said encoded data.

One advantage is to allow immediate use of the UWB transmitter device by the logistics chain without any software or hardware modification. A thermal printing of the transmitter device allows pairing an identifier of an object with an identifier of a radio location system of the UWB type.

According to a first alternative embodiment, the thermal printing activates the electrical conductivity of a plurality of physical regions of the support. According to a second alternative embodiment, thermal printing deactivates the electrical conductivity of a plurality of physical regions of the support.

One advantage is that a parameterizable electrical state can be changed by means of a thermal printing.

According to one embodiment, the heat-sensitive element is a heat-melt element or a heat-crackable element. One advantage is to allow a printing configuration according to the printer or device activating the temperature on the support.

According to one embodiment, the support forms an element of an electrical circuit comprising two interfaces connected to at least two inputs/outputs of the electronic chip.

One advantage is to make it possible to write an electrical state directly readable by an electronic chip of said transmitter device.

According to one embodiment, the transmitted UWB radio signal encodes an identifier of the transmitter device and a second identifier thermally printed on the support. One advantage is to transmit a radio signal comprising directly a pair of values making it possible to pair the two identifiers so that they can be more easily used according to the information systems deployed.

According to one embodiment, the printed support includes a printed graphic code. One advantage is that the code can be read from a device comprising an optical reader, for example.

According to one embodiment, the printed graphic code is a QR code, a Flash Code, a barcode or a DataMatrix code.

One advantage is that the code can be read from a device comprising an optical reader, for example.

According to one embodiment, the transmission of a UWB radio message is automatically generated as soon as a sufficient level of energy by radio is reached.

According to one embodiment, the support comprises two layers separated by the heat-sensitive element, the thermal printing activating conductions between the two layers.

In this embodiment, one of the objectives of the invention is to provide a programmable transmitter device during its printing phase without equipment other than a thermal printer.

FIG. 2 shows an example embodiment in which a transmitter device $EM_1$ is shown. In this example, a first antenna $ANT_1$ making it possible to transmit UWB signals is shown. A second $ANT_2$, called ANT0 in FIG. 1, making it possible to receive energizing radio waves is shown. According to one example, UHF signals are received by the transmitter device in order to supply a capacitor serving as an electrical energy reserve. This energy, when sufficient, automatically generates the transmission of a UWB message.

FIG. 2 comprises a support $S_1$ having conductor tracks separated by a heat-sensitive element $ETS_1$ extending along the length of the transmitter device. During thermal printing, the heat sensitive track modifies its physical state to make the tracks on one side of the substrate conductive with the tracks on the other side of the heat-sensitive element $ETS_1$.

In the case of FIG. 2, the heat-sensitive element $ETS_1$ may be arranged in the thickness of the support. When the temperature activates the modification of the state of the heat-sensitive element $ETS_1$, conductive elements are released to electrically join certain tracks of each of the two parts of the support $S_1$ located on either side of the heat-sensitive element $ETS_1$. The modification may be a melting of an insulating layer and comprising conductive particles or a conductive ink or coating.

FIG. 2 shows an electrical circuit $CIR_1$ that can be configured according to the configured thermal printing patterns. Thus, an identifier can be electrically encoded by thermal printing on the support $S_1$. This identifier can then be read by the electric tracks of an electronic chip $PE_1$ of the transmitter device $EM_1$.

FIG. 3 shows another example embodiment wherein the heat-sensitive element $ETS_1$ is arranged in the form of a layer located between two layers, a lower layer and an upper layer. FIG. 3 shows a section of the thickness of the support $S_1$ of the transmitter device $EM_1$. Each conductor track forms part of the electrical circuit. The heat-sensitive layer $ETS_1$ is then modified during printing to electrically join a first circuit of the upper layer with a second circuit of the lower layer.

FIG. 4 shows an example of FIG. 2 once the support is printed. The intermediate layer has been modified to connect conductive portions of the upper layer with conductive portions of the lower layer.

The embodiments of FIG. 2 and FIGS. 3 and 4 can be combined with a heat-sensitive element inserted as a layer comprised within the thickness of the support $S_1$ and in a layer within a lateral slice of the support. According to other embodiments, it may be integrated as a three-dimensional substrate distributed in the volume of the support.

According to one example, the transmitter device may take the form of a blank tag to be printed which comprises an electronic chip comprising inputs and outputs to transmit and receive signals with the antennas $ANT_1$: UWB and $ANT_2$: UHF.

According to a usage mode, the radio transmitter does not initially have a programmed identifier. A "matrix" of conductive inputs is placed in the thickness of a paper layer, and will be programmed by the heat of thermal printing. One advantage is to use the heat fusion principle of the print head to program links at the conductive input matrix. The conductive input matrix is printed in such a way that an electrical state can be printed on electrical interfaces that are read by the electronic chip of the transmitter device $EM_1$.

When the graphic code is printed, the fusion points are generated by the thermal print head of a thermal printer.

When the electronic chip $PE_1$ transmits a UWB signal, it uses the identifier generated by thermal printing and encoded by the barcode. One advantage is to also make the identifier visually accessible thanks to printing on the support. The identifier is then retrieved by the electronic chip $PE_1$ and transmitted by UWB radio. This identifier may be read by an optical reader scanning the graphic code.

According to one embodiment, the transmitter is not a UWB transmitter but an RFID transmitter.

According to one embodiment, the transmitter device $EM_1$ comprises a pre-recorded identifier and a programmable identifier.

According to one embodiment, the electronic chip $PE_1$ can read the code at each transmission or permanently program a reading at the first transmission. This last method avoids damaging the identifier reading following a shock or scratch of the support.

Example Embodiment of the Invention when the Sensor is of the Electrical Conductor Type Coupled to a Zone Intended to Receive a Conductive Ink According to another aspect, the invention relates to a radio transmitter device comprising a radio transmission module and a radio reception module for collecting signals for electrically supplying the transmission module, characterized in that said transmitter device comprises a support comprising electrically conductive regions and a plurality of zones intended to receive an ink, depositing an ink in at least one of said zones modifying the electrical conductivity of a plurality of physical regions of said support, said physical regions of the support forming a set of electrical interfaces connected to the reading inputs of an electronic chip of said transmitter device, transmission of a radio signal being carried out successively by reading the electrical state of said electrical interfaces and encoding data corresponding to said electrical state read by the chip, said transmitted radio signal comprising said encoded data.

According to one example, the radio transmitter device transmits in the UWB frequency range, "Ultra Wide Band", it is therefore a UWB transmitter. According to another example, the transmitter is an RFID type transmitter. In the latter case, RFID antennas can transmit at low frequencies 125 KHz or at high frequencies 13.56 MHz for passive transmitters. RFID antennas can transmit in frequencies around 2.4 GHz for passive, active and semi-active transmitters, even in UHF frequencies around 868 MHz for certain passive and active transmitters.

According to yet another aspect, the invention relates to a UWB radio transmitter device comprising a UWB radio transmitter module and a UHF radio receiver module for collecting signals for electrically supplying the UWB transmitter module, characterized in that said UWB transmitter device comprises a support comprising electrically conductive regions and a plurality of zones intended to receive an ink, depositing an ink in at least one of said zones modifying the electrical conductivity of a plurality of physical regions of said medium, said physical regions of the medium forming a set of electrical interfaces connected to the reading inputs of an electronic chip of said UWB transmitter device, transmission of a UWB signal being performed successively upon reading the electrical state of said electrical interfaces and encoding a data corresponding to said electrical state read by the chip, said UWB radio signal transmitted including said encoded data.

One advantage is to allow immediate use of the UWB transmitter device by the logistics chain without any software or hardware modification. An ink deposit on a zone of the support of the transmitter device allows pairing an identifier of an object with an identifier of a radio location system of the UWB type.

According to a first alternative embodiment, ink deposition activates the electrical conductivity of a plurality of physical regions of the support. According to a second alternative embodiment, ink deposition electrically isolates a plurality of physical regions of the support.

According to different embodiments, either the ink is conductive, or it contains a product which activates the conductivity or insulation of a substrate already present on the UWB transmitter device and more generally the transmission module. This can be implemented, for example, by a chemical reaction.

One advantage is to modify an electrical state configurable by ink deposition in certain pre-existing zones.

According to one embodiment, the zones intended to receive a conductive ink are electrically connected to electrical interfaces of the electronic chip of the transmitter device.

According to one embodiment, at least one zone is disposed between two conducting elements, for example two electrical lugs. One advantage is to enable a configuration wherein an operator can decide on the combination of zones to be filled in to generate a numerical code to be transmitted according to the measured impedance of the circuit configured by the ink deposit.

According to one embodiment, the support forms an element of an electrical circuit comprising at least two interfaces connected to at least two inputs/outputs of the electronic chip.

One advantage is to make it possible to write an electrical state directly readable by an electronic chip of said transmitter device.

According to one embodiment, the transmitted UWB radio signal encodes an identifier of the transmitter device and data the value of which depends on an ink deposition configuration in the zones of the support. One advantage is to transmit a radio signal comprising directly a pair of values making it possible to pair the two identifiers so that they can be more easily used according to the information systems deployed.

According to one embodiment, the printed support includes a printed graphic code. One advantage is that the code can be read from a device comprising an optical reader, for example. According to one example, the ink deposited within the zones of the support forms all or part of the visible graphic code.

According to one embodiment, the printed graphic code is a QR code, a Flash Code, a barcode or a DataMatrix code.

One advantage is that the code can be read from a device comprising an optical reader, for example.

According to one embodiment, the transmission of a UWB radio message is automatically generated as soon as a sufficient level of energy by radio is reached.

According to one embodiment, the ink comprises a set of conductive particles.

According to one embodiment, the ink makes it possible to modify the properties of the support to which it is affixed. For example, a solvent that activates a substance in the tag and it is the tag that becomes conductive. It is an alternative embodiment of a conductive ink. In one case there is a conductive ink, in the second case the ink activates a substance which becomes conductive.

According to one embodiment, the zones intended to receive ink form a matrix electrically connected to a plurality of inputs/outputs of the electronic chip.

According to one aspect, one of the objectives of the invention is to provide a programmable transmitter device when certain zones are covered with ink without any equipment other than a pen or printer.

FIG. 5 shows an example embodiment in which a transmitter device $EM_1$ is shown. In this example, a first antenna $ANT_1$ making it possible to transmit UWB signals is shown. A second $ANT_2$ making it possible to receive energizing radio waves, called $ANT_0$ in FIG. 1, making it possible to receive energizing radio waves is shown. According to one example, UHF signals are received by the transmitter device in order to supply a capacitor serving as an electrical energy reserve. This energy, when sufficient, automatically generates the transmission of a UWB message.

FIG. 5 comprises a support $S_1$, which is a support different from that of FIGS. 2 to 4, having conductive tracks separated by at least one zone $ZA_1$ intended to receive an ink $EC_1$ extending according to a predefined shape such as square, circular, parallelepiped or triangular shapes. According to one example, the zones are made in slight cavities formed on the surface of the support $S_1$. When the ink is deposited with a pen, a conductive track comes into contact with electrically conductive ink. When a zone is in contact with different electrically conductive tracks, depositing a conductive ink results in rendering a track with at least one other track.

FIG. 5 shows an electrical circuit $CIR_1$ configurable according to the zones covered with ink. Thus, an identifier can be electrically encoded by depositing an ink $EC_1$ on certain zones of the support $S_1$. This identifier can then be read by the electric tracks of an electronic chip $PE_1$ of the transmitter device $EM_1$. This may be a configurable part corresponding to an identifier pre-recorded in a memory of the electronic chip $PE_1$.

FIG. 6 shows a section of the thickness of the support $S_1$ according to an embodiment of the transmitter device $EM_1$ which may be that of FIG. 5 or which may correspond to another embodiment. FIG. 6 shows another example embodiment in which the electric tracks $R_1$ and $R_1'$ comprise two conductive elements forming projections arranged at the zone $Z_{A2}$ so as to increase the conductive contact surfaces with the ink. When the ink $EC_1$ is deposited at the zone $ZA_2$, the ink can cover the two small projections arranged on the surface of the support.

According to one example, the transmitter device may take the form of a blank tag to be printed which comprises an electronic chip $PE_1$ comprising inputs and outputs to transmit and receive signals with the antennas $ANT_1$: UWB and $ANT_2$: UHF.

According to a usage mode, the radio transmitter device $EM_1$ initially has no programmed identifier. A conductive input "matrix" is placed on the support $S_1$, and will be programmed by depositing an ink on a set of zones intended to receive the ink. The conductive input matrix is printed in such a way that an electrical state can be printed on electrical interfaces that are read by the electronic chip $PE_1$ of the transmitter device $EM_1$.

The chip of the transmitter device $EM_1$ is connected to a matrix of points that has contact(s) on the surface of a support of said transmitter device $EM_1$. According to one example, a pen deposits its ink which contains a few conductive particles. When a box is checked, for example, on the support of the transmitter device $EM_1$, or even if a text is written on it (according to the density of the contacts on the surface), conduction is established by the ink which gives information to be reported by radio.

When the chip transmits a UWB signal, it uses the identifier generated by the new connections established with the ink and encoded by the graphic code generated by the ink. One advantage is to also make the identifier visually accessible thanks to printing on the support $S_1$. The identifier is then retrieved by the chip PE1 and transmitted by UWB radio channel. This identifier can also be accessed via an optical reader scanning the graphic code.

According to one embodiment, the transmitter is not a UWB transmitter but an RFID transmitter.

According to one embodiment, the transmitter device $EM_1$ comprises a pre-recorded identifier and a programmable identifier.

According to one embodiment, the electronic chip $PE_1$ is configured to read the code at each transmission or to permanently program a read at the first transmission. This last method avoids damaging the reading of the identifier following an impact or scratch of the support.

According to one example, an ink that can be erased dry or with alcohol based on the resistance that is to be given to it can be used. This example makes it possible to reset the transmitter device $EM_1$ for reuse.

Example of a UWB Radio Transmitter Device

A UWB radio transmitter device may comprise an electronic support comprising a modulator and a UWB antenna. The radio transmitter device transmits messages in the form of ultra-wideband radio pulse sequences, known as "UWB messages". Such UWB messages, formed by a sequence of radio pulses, are also referred to as "Ultra Wide Band-Impulse Radio" or UWB-IR. The transmitter device of the invention may be assimilated to a radio tag when it is intended to be affixed or attached to an object for localization.

The UWB transmitter device consists of a modulator and an antenna for transmitting a signal in the UWB band. The data is modulated by the modulator. According to one embodiment, a memory and a calculator may be integrated into the radio transmitter device to process, store, format the data to be transmitted in the UWB messages or signals.

According to an example embodiment, the UWB radio transmitter device comprises a power supply in order to supply voltage to the different components. According to another embodiment, the power supply comes from a capacitor that is charged through the reception and collection of radio waves, for example in the UHF band.

According to one embodiment, the UWB radio transmitter device comprises a control module configured to control transmissions of UWB messages. According to one embodiment, the transmission period, transmission power, data coding, UWB modulation, etc. are configured in the control module to perform the transmissions of UWB messages. According to one example, a stored energy threshold can trigger the transmission of a UWB message. According to one embodiment, the various functions listed may be supported by different components or be implemented by the same component.

According to one embodiment, the UWB radio transmitter device comprises a radio reception module to receive a radio wave stream. In this embodiment, a radio stream emitting beacon allows the UWB radio transmitter device to collect radio frequency energy.

According to one embodiment, a beacon emitting a radio stream may be one or more wireless power supply stations distributed over the geographical zone covered by the UWB reception beacons. In this embodiment, the wireless electrical power supply stations remotely supply the tags 20 with electrical energy. According to one embodiment, the transmitter beacons, also known as "wireless power supply stations" or UHF generator, are separate from the receiver beacons. However, there is nothing to exclude, according to other examples, having one or more said wireless power supply stations that are integrated into one or more UWB receiver beacons, such that at least one piece of equipment of said position estimation system is both a wireless power supply station and a receiver beacon.

According to the embodiment, the UWB transmitter device comprises a rectifier to convert the spectral power received by the radio reception module into an electrical voltage or current. The converted energy can then be stored in an electrical storage unit, such as a capacitor. The electric storage unit thus acts as a battery to supply the energy required to transmit UWB messages. According to one example, the capacitor can be controlled electrically from an electrical setpoint generated by the component or directly by itself when a charge level is reached.

According to one embodiment, the transmitter device of the invention could also power a sensor and/or a calculator, for example a microprocessor, which interface with the UWB modulator.

According to one embodiment, the UWB radio transmitter device comprises a simplex communication module. "Simplex" means that the communication module is only suitable for transmitting UWB messages but does not allow receiving UWB messages transmitted by other third-party equipment.

According to one example, the simplex communication module is for example in the form of an electrical circuit comprising equipment such as an antenna, an amplifier, a local oscillator, a mixer, an analog filter and any other equipment that may contribute to the transmission of UWB signals.

According to one example, the simplex communication module is configured to transmit UWB messages in a frequency band centered on 4 gigahertz (GHz) and/or centered on 7.25 GHz. However, there is nothing to rule out the possibility of frequency bands being centered on other frequencies.

UWB messages, transmitted as radio signals, have at a given moment an instantaneous frequency spectrum of a predetermined width, for example between 500 megahertz (MHz) and 2.5 GHz, which corresponds to radio pulses of durations ranging respectively between a few nanoseconds and a few tenths of nanoseconds.

In one embodiment, the simplex communication module is configured to transmit UWB messages using on/off radio pulse modulation ("On Off Keying" or OOK) to encode bits to be transmitted. This means that the values of the bits to be transmitted are encoded by the presence or absence of a radio pulse. For example, if at a given moment the bit to be transmitted is "1", then the simplex communication module transmits a radio pulse, whereas if the bit to be transmitted is "0", said simplex communication module does not transmit a radio pulse. Such measures are advantageous in that they reduce the electrical power consumption required to transmit a UWB message, since the transmission of bits to be transmitted at "0" consumes almost no electrical energy.

According to another embodiment, a modulation in pulse position modulation (PPM) can be implemented in the method of the invention. For example, by considering that the bits to be transmitted in the form of radio pulses are pulsed at a predetermined period Tc, then at each period Tc, the pulses are transmitted with an offset in relation to the period Tc, the value of said offset depending on the value of the bit to be transmitted.

According to one embodiment, each ultra-wideband radio pulse can be formed by multiplying a sinusoidal signal by a pulse envelope. In this case, the local oscillator forming the sinusoidal signal corresponding to the carrier frequency of the radio pulses can remain activated continuously over the duration of the UWB message, and the amplitude of said sinusoidal signal is modulated by said pulse envelope. Apart from the radio pulse transmission moments, the amplitude of the sinusoidal signal is modulated by a zero value signal.

The modulated signal obtained after amplitude modulation of the sinusoidal signal is then supplied at the input of the amplifier, which can also remain activated for the entire duration of the UWB message to be transmitted. By modulating the sinusoidal signal by a pulse envelope before amplifying, the radio pulses are formed before the amplifier. Said amplifier therefore no longer forms the radio pulses, but merely amplifies said radio pulses previously formed. Note that it is still possible to deactivate the amplifier between radio pulses to reduce the power consumption of the amplifier.

According to one embodiment, the control module includes one or more processors and storage means (magnetic hard disk, electronic memory, optical disk, etc.) in which a computer program product is stored, in the form of a set of program code instructions to be executed.

Alternatively or in addition, the control module contains programmable logic circuit(s) (FPGA, PLD, etc.), and/or specialized integrated circuit(s) (ASIC).

According to one embodiment, the control module comprises a set of means configured in software (specific computer program product) and/or hardware (FPGA, PLD, ASIC, discrete electronic components, etc.).

In order to reconstruct the position of a transmitter device, the server comprises means for performing:

A consistency check between each message received by a plurality of reception beacons, the consistency corresponding to a difference in message arrival time less than a predefined threshold and;

Construction of the position of a transmitter device by a trilateration algorithm between the arrival times of the different UWB messages.

Such a method relies on the use of the different flight times of UWB messages transmitted by a transmitter device and received by each reception beacon.

In order to perform such an algorithm, according to an example, the system comprises a device for transmitting a clock that broadcasts synchronization data to the different reception beacons. Each beacon $B_1$, $B_2$, $B_3$ receives a synchronization signal from, for example, another system or a "master" beacon. The synchronization signal is, for example, a signal comprising a time marker distributed to each beacon, said signal being generated from a remote clock.

According to one embodiment, each beacon comprises a calculator for:

extracting at least one identification data from said radio tag;

computing time information that time stamps the reception of a message transmitted by the transmitter device, said time marker being generated from a clock and a synchronization message. In the latter case, each beacon includes, for example, an interface to receive said synchronization signal.

The invention claimed is:

1. An ultra wide band (UWB) radio transmitter device comprising a UWB radio transmission module and an ultra high frequency (UHF) radio reception module for collecting signals for electrically supplying the UWB radio transmission module, wherein said UWB radio transmitter device comprises a state sensor of a physical property of an element of said sensor, a change of a state of said physical property of the element resulting in a modification of an electrical state of an electrical interface of said sensor, a transmission of a UWB signal comprising the transmission of a data corresponding to the electrical state of the electrical interface, said electrical state corresponding to the state of the physical property of the element of the sensor.

2. The UWB radio transmitter device according to claim 1, wherein the change in the state of the physical property passively affects an electrical conductivity of a physical region of the sensor, said physical region forming an electrical interface of said UWB radio transmitter device and being connected to reading inputs of an electronic chip of the UWB radio transmitter device, the transmission of a UWB signal comprising the reading of the electrical state of said electrical interfaces and the transmission of a data corresponding to said electrical state.

3. The UWB radio transmitter device according to claim 2, wherein the change in conductivity of a zone of said sensor corresponds to a change in a voltage, in an impedance of said zone.

4. The UWB radio transmitter device according to claim 1, wherein the transmission is performed from the energy collected by the UHF radio reception module.

5. The UWB radio transmitter device according to claim 1, wherein the transmitted data further comprises an identifier stored in a memory of the UWB radio transmitter device and a data characterizing the type of sensor.

6. The UWB radio transmitter device according to claim 1, wherein the change in the state of physical property relates to a change in a chemical property of a material, a change in a conductivity of a zone of said sensor, a change in a mechanical state of a zone of said sensor.

7. The UWB radio transmitter device according to claim 1, wherein the sensor is made removable from the UWB radio transmitter device.

8. The UWB radio transmitter device according to claim 1, wherein when sufficient energy is collected by the UHF radio reception module, the UWB radio transmission module automatically reads the state of the physical property of the element of the sensor and automatically transmits a UWB message comprising said data.

9. The UWB radio transmitter device according to claim 1, wherein the sensor is a sensor among the following set of sensors:

an impact sensor comprising an accelerometer;

a tread;

a mechanical indicator of a seal;

a container of a chemical reagent;

a sensor comprising a hot melt material;

a pressure sensor;

a humidity sensor comprising a pellet a conductivity of which is modified when the humidity of said pellet exceeds a threshold;

a usage counter;

a pull-off detector.

10. The UWB radio transmitter device according to claim 1, wherein said UWB transmitter device comprises a support, the support comprising electrically conductive regions and a heat-sensitive element, a thermal printing of said element modifying the electrical conductivity of a plurality of physical regions of said support, said physical regions of the support forming a set of electrical interfaces connected to reading inputs of an electronic chip of said UWB transmitter device, an emission of a UWB signal being performed successively to the reading of the electrical state of said electrical interfaces and encoding of data corresponding to said electrical state read by the chip, said transmitted signal comprising said encoded data.

11. The UWB radio transmitter device according to claim 10, wherein the support comprises two layers separated by the heat-sensitive element, the thermal printing activating electrical conduction between the two layers.

12. The UWB radio transmitter device according to claim 10, wherein the transmitted UWB signal encodes an identifier of the transmitter device and a second identifier thermally printed on the support.

13. The UWB radio transmitter device according to claim 1, comprising a radio reception module for collecting signals for electrically supplying the transmission module, characterized in that said UWB radio transmitter device comprises a support comprising electrically conductive regions and a plurality of zones intended to receive an ink, depositing an ink in at least one of said zones modifying the electrical conductivity of a plurality of physical regions of said support, said physical regions of the support forming a set of electrical interfaces connected to reading inputs of an electronic chip of said transmitter device, transmission of the UWB signal being carried out successively by reading the electrical state of said electrical interfaces and encoding data corresponding to said electrical state read by the chip, said transmitted signal comprising said encoded data.

14. The UWB radio transmitter device according to claim 13, wherein at least one of the plurality of zones is disposed between two conducting elements, for example two electrical lugs.

15. The UWB radio transmitter device according to claim 13, wherein the UWB signal encodes an identifier of the transmitter device and data having a the value depending on an ink deposition configuration in the plurality of zones.

16. The UWB radio transmitter device according to claim 13, wherein a conductive matrix is printed on the support in such a way that depositing the ink on the matrix printing an electrical state of the set of electrical interfaces.

* * * * *